(12) United States Patent
Fujita

(10) Patent No.: US 9,686,464 B2
(45) Date of Patent: *Jun. 20, 2017

(54) IMAGE PICKUP APPARATUS CAPABLE OF EASILY GENERATING ALBUM, METHOD OF CONTROLLING THE SAME, AND STORAGE MEDIUM

(71) Applicant: CANON KABUSHIKI KAISHA, Tokyo (JP)

(72) Inventor: Shunji Fujita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/483,822

(22) Filed: Sep. 11, 2014

(65) Prior Publication Data

US 2014/0375839 A1 Dec. 25, 2014

Related U.S. Application Data

(63) Continuation of application No. 13/174,829, filed on Jul. 1, 2011, now Pat. No. 8,848,084.

(30) Foreign Application Priority Data

Jul. 6, 2010 (JP) .................. 2010-153814

(51) Int. Cl.
*H04N 5/222* (2006.01)
*H04N 5/232* (2006.01)
*H04N 5/272* (2006.01)

(52) U.S. Cl.
CPC ..... *H04N 5/23216* (2013.01); *H04N 5/23245* (2013.01); *H04N 5/23293* (2013.01); *H04N 5/272* (2013.01)

(58) Field of Classification Search
CPC ........... H04N 5/23216; H04N 5/23245; H04N 5/23293; H04N 5/272

(Continued)

(56) References Cited

U.S. PATENT DOCUMENTS 7,034,881 B1 4/2006 Hyodo et al.
7,391,445 B2 6/2008 Herberger et al.
(Continued)

FOREIGN PATENT DOCUMENTS

| JP | 11136568 A | 5/1999 |
| JP | 2008-017238 A | 1/2008 |
| JP | 2008258745 A | 10/2008 |

OTHER PUBLICATIONS

Chinese Office Action cited in Chinese counterpart application No. CN201110192957.7, dated Aug. 23, 2013. Cited in parent U.S. Appl. No. 13/174,829.

(Continued)

*Primary Examiner* — Antoinette Spinks
(74) *Attorney, Agent, or Firm* — Rossi, Kimms & McDowell LLP

(57) ABSTRACT

An image pickup apparatus that is capable of generating an album by laying out desired images in desired positions by a simple operation, while confirming a result of the layout by a photographer when shooting an image. A control section displays a through-the lens-image obtained by shooting an object on a display section by inserting the through-the lens-image in a plurality of frames on a template. When it is detected that one of the plurality of frames has been designated, the control section generates an image file by executing image pickup processing, and stores the generated image file in a storage medium in association with the designated frame of the plurality of frames on the template.

21 Claims, 11 Drawing Sheets

(58) Field of Classification Search
USPC .............. 348/231.2, 333.01–333.05, 333.12
See application file for complete search history.

(56) References Cited

U.S. PATENT DOCUMENTS

| | | |
|---|---|---|
| 8,004,592 B2 | 8/2011 | Abe |
| 8,049,915 B2 | 11/2011 | Yokokura |
| 2001/0048802 A1 | 12/2001 | Nakajima et al. |
| 2004/0032599 A1 | 2/2004 | Atkins |
| 2005/0219384 A1 | 10/2005 | Herberger et al. |
| 2005/0219465 A1 | 10/2005 | Lawrence |
| 2008/0007631 A1 | 1/2008 | Abe |
| 2008/0152188 A1 | 6/2008 | Yokokura |
| 2008/0239133 A1* | 10/2008 | Cazier et al. ............ 348/333.05 |

OTHER PUBLICATIONS

Non-Final Office Action dated Apr. 11, 2013 issued in parent U.S. Appl. No. 13/174,829.
Final Office Action dated Aug. 22, 2013 issued in parent U.S. Appl. No. 13/174,829.
Non-Final Office Action dated Feb. 6, 2014 issued in parent U.S. Appl. No. 13/174,829.
Notice of Allowance dated May 28, 2014 issued in parent U.S. Appl. No. 13/174,829.
Office Action issued in JP2014-117651, mailed Mar. 31, 2015.

* cited by examiner

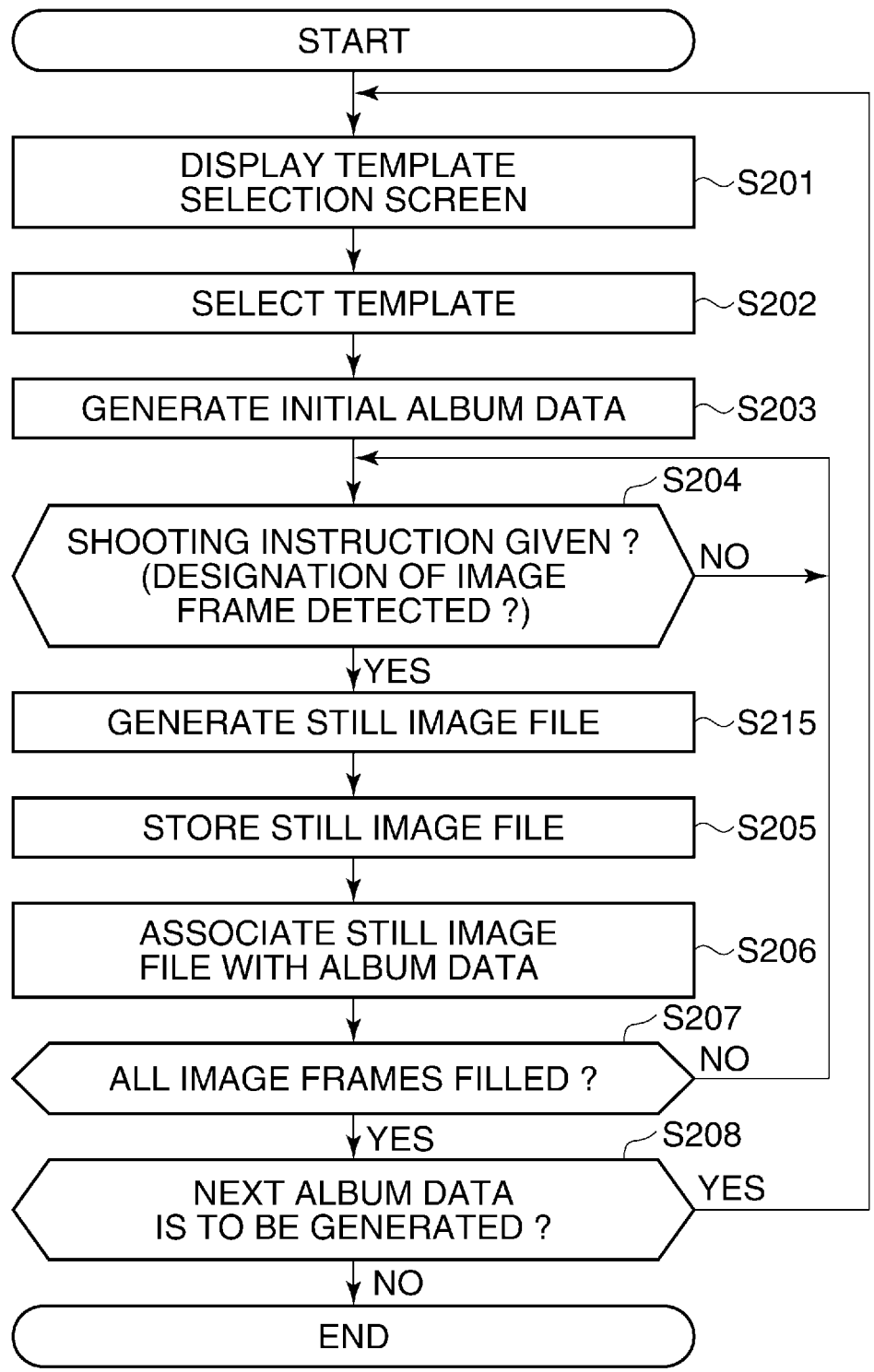

FIG.4A

```
<?xml version="1.0" standalone="no"?>
<!DOCTYPE svg PUBLIC "-//W3C//DTD SVG 1.0//EN"
"http://www.w3.org/TR/2000/REC-SVG-20010904/DTD/svg10.dtd">
<svg width="600" height="400">                                         401
<title>Page_1</title>                                                  402
<image id="1" x="50" y="30" width="200" height="150" xlink:href= "camera"/>  403
<image id="2" x="420" y="30" width="140" height="105" xlink:href= "camera"/> 404
<image id="3" x="50" y="275" width="140" height="105" xlink:href= "camera"/>
<image id="4" x="280" y="170" width="280" height="210" xlink:href= "camera"/>
</svg>
```

FIG.4B

```
<?xml version="1.0" standalone="no"?>
<!DOCTYPE svg PUBLIC "-//W3C//DTD SVG 1.0//EN"
"http://www.w3.org/TR/2000/REC-SVG-20010904/DTD/svg10.dtd">
<svg width="600" height="400">                                                             405
<title>Page_1</title>
<image id="1" x="50" y="30" width="200" height="150" xlink:href= "/DCIM/100CANON/IMG_0001.JPG"/>
<image id="2" x="420" y="30" width="140" height="105" xlink:href= "camera"/>
<image id="3" x="50" y="275" width="140" height="105" xlink:href= "camera"/>
<image id="4" x="280" y="170" width="280" height="210" xlink:href= "camera"/>
</svg>
```

FIG.4C

```
<?xml version="1.0" standalone="no"?>
<!DOCTYPE svg PUBLIC "-//W3C//DTD SVG 1.0//EN"
"http://www.w3.org/TR/2000/REC-SVG-20010904/DTD/svg10.dtd">
<svg width="600" height="400">
<title>Page_1</title>                                                                      406
<image id="1" x="50" y="30" width="200" height="150" xlink:href= "/DCIM/100CANON/IMG_0001.JPG"/>
<image id="2" x="420" y="30" width="140" height="105" xlink:href= "/DCIM/100CANON/IMG_0003.JPG"/>
<image id="3" x="50" y="275" width="140" height="105" xlink:href= "/DCIM/100CANON/IMG_0004.JPG"/>
<image id="4" x="280" y="170" width="280" height="210" xlink:href= "/DCIM/100CANON/IMG_0002.JPG"/>
</svg>
                                                                                           407
                                                                                           408
```

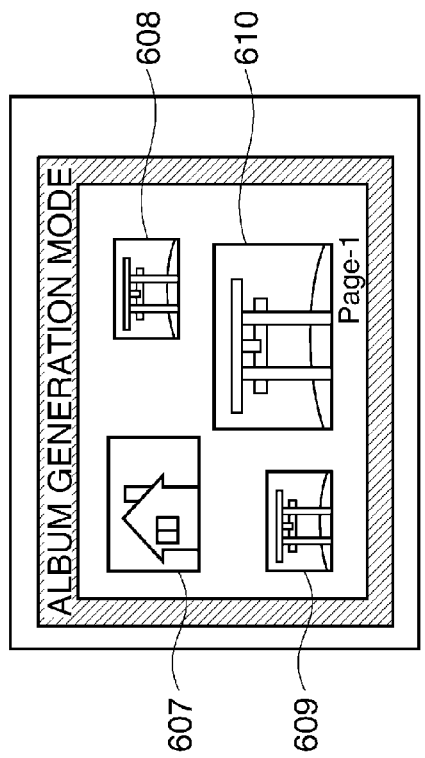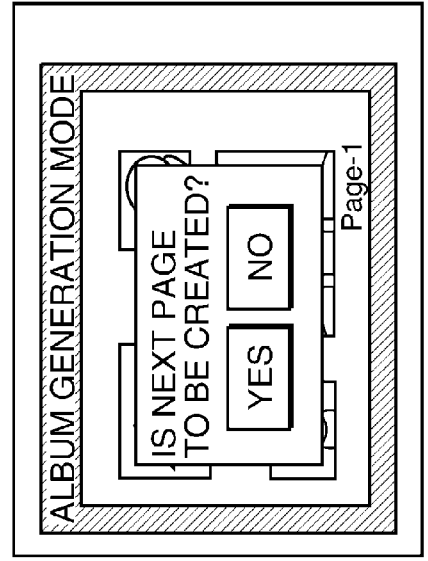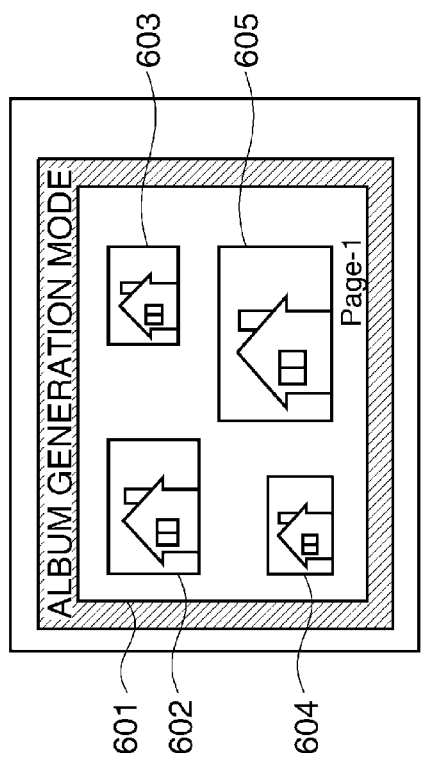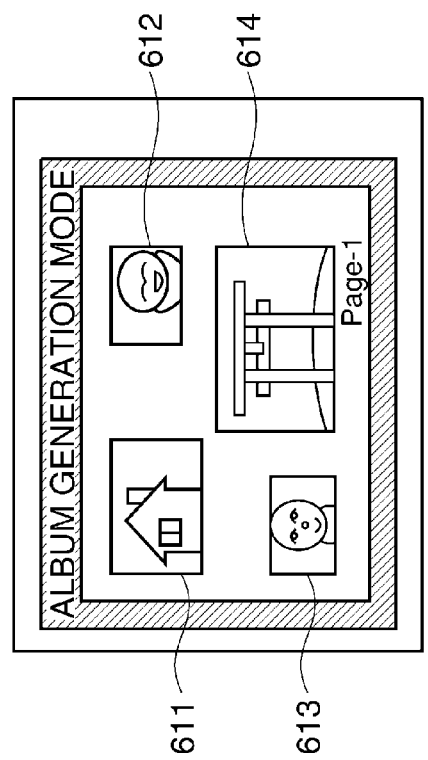

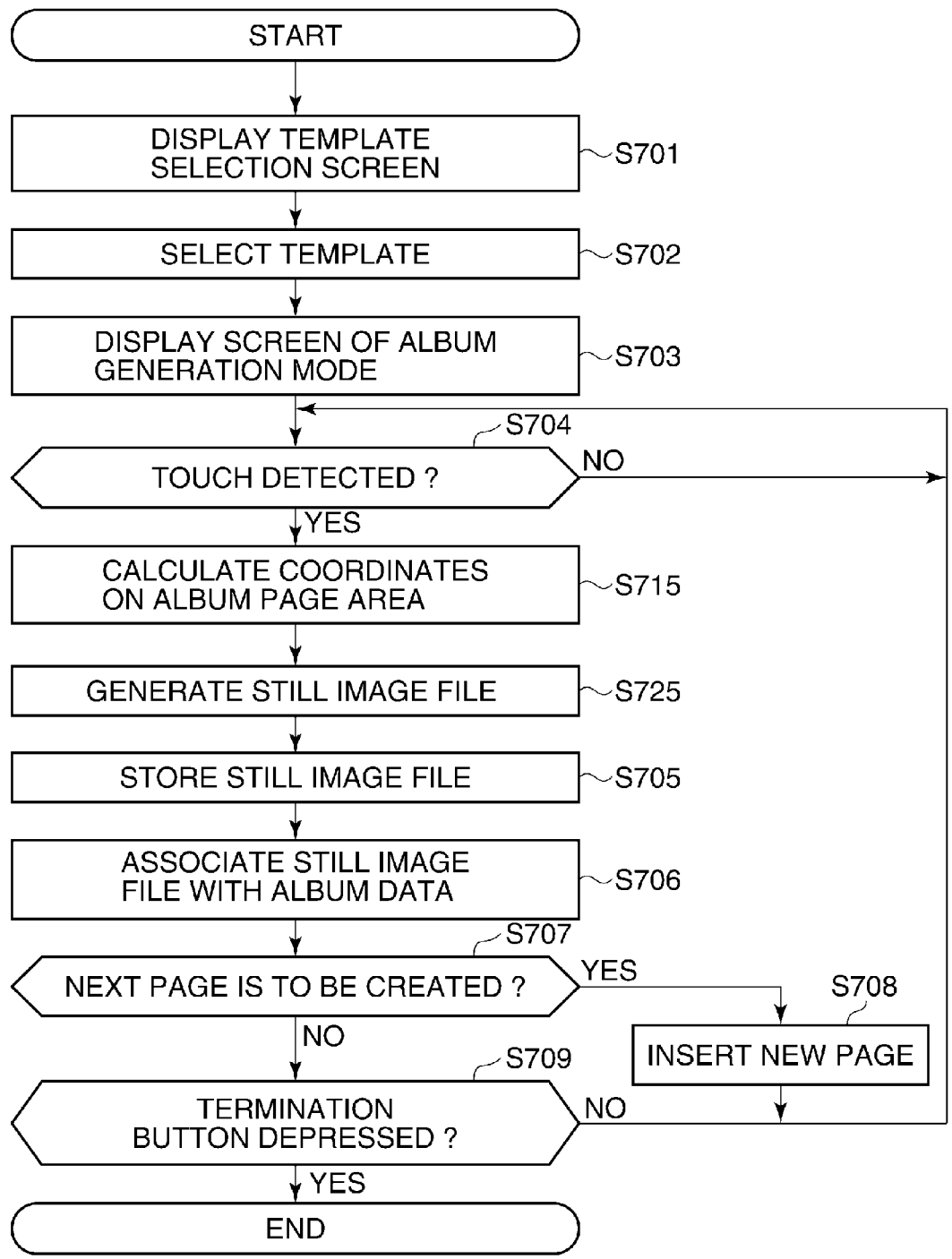

FIG.9A

```
<?xml version="1.0" standalone="no"?>
<!DOCTYPE svg PUBLIC "-//W3C//DTD SVG 1.0//EN"
 "http://www.w3.org/TR/2000/REC-SVG-20010904/DTD/svg10.dtd">
<svg width="600" height="600">
<title>Page 1</title>
</svg>
```

FIG.9B

```
<?xml version="1.0" standalone="no"?>
<!DOCTYPE svg PUBLIC "-//W3C//DTD SVG 1.0//EN"
 "http://www.w3.org/TR/2000/REC-SVG-20010904/DTD/svg10.dtd">
<svg width="600" height="600">
<title>Page 1</title>
<image id="1" x="50" y="75" width="200" height="150" xlink:href= "DCIM/100CANON/IMG_0001.JPG"/>
</svg>
```

FIG.9C

```
<?xml version="1.0" standalone="no"?>
<!DOCTYPE svg PUBLIC "-//W3C//DTD SVG 1.0//EN"
 "http://www.w3.org/TR/2000/REC-SVG-20010904/DTD/svg10.dtd">
<svg width="600" height="600">
<title>Page_1</title>
<image id="1" x="50" y="75" width="200" height="150" xlink:href= "DCIM/100CANON/IMG_0001.JPG"/>
<image id="2" x="320" y="100" width="200" height="150" xlink:href= "DCIM/100CANON/IMG_0002.JPG"/>
<image id="3" x="100" y="350" width="200" height="150" xlink:href= "DCIM/100CANON/IMG_0003.JPG"/>
<image id="4" x="350" y="400" width="200" height="150" xlink:href= "DCIM/100CANON/IMG_0004.JPG"/>
</svg>
```

FIG.9D

```
<?xml version="1.0" standalone="no"?>
<!DOCTYPE svg PUBLIC "-//W3C//DTD SVG 1.0//EN"
 "http://www.w3.org/TR/2000/REC-SVG-20010904/DTD/svg10.dtd">
<svg width="600" height="600">
<title>Page_1</title>
<image id="1" x="50" y="75" width="200" height="150" xlink:href= "DCIM/100CANON/IMG_0001.JPG"/>
<image id="2" x="320" y="100" width="200" height="150" xlink:href= "DCIM/100CANON/IMG_0002.JPG"/>
<image id="3" x="100" y="350" width="200" height="150" xlink:href= "DCIM/100CANON/IMG_0003.JPG"/>
<image id="4" x="350" y="400" width="200" height="150" xlink:href= "DCIM/100CANON/IMG_0004.JPG"/>
</svg>
<svg width="600" height="600">
<title>Page_2</title>
</svg>
```

IMAGE PICKUP APPARATUS CAPABLE OF EASILY GENERATING ALBUM, METHOD OF CONTROLLING THE SAME, AND STORAGE MEDIUM

BACKGROUND OF THE INVENTION

Field of the Invention

The present invention relates to an image pickup apparatus that shoots images, and generates an album using the shot images, a method of controlling the image pickup apparatus, and a storage medium.

Description of the Related Art

There has been proposed an image pickup apparatus (digital camera) that shoots images, and lays out the shot images on a page to thereby generate an album (see e.g. Japanese Patent Laid-Open Publication No. 2008-17238).

However, in the image pickup apparatus disclosed in Japanese Patent Laid-Open Publication No. 2008-17238, the shot images are inserted in an image frame in an order shot by a photographer, and hence it is not possible to lay out the shot images in desired positions immediately after the shooting operation.

SUMMARY OF THE INVENTION

The present invention provides an image pickup apparatus that shoots images and generates an album using the shot images, which is capable of generating an album by laying out desired images in desired positions by a simple operation, while confirming a result of the layout by a photographer when shooting images, a method of controlling the image pickup apparatus, and a computer-readable storage medium storing a program implementing the method.

In a first aspect of the present invention, there is provided an image pickup apparatus, comprising a display unit configured to display a through-the lens-image obtained by shooting an object, on a display section, by inserting the through-the lens-image in a plurality of frames in a template, a detection unit configured to detect that one of the plurality of frames in which the through-the lens-image is displayed is designated, a generation unit configured to generate an image file by executing image pickup processing when detection by the detection unit has occurred, and a storage unit configured to store the generated image file in association with the designated frame of the plurality of frames in the template.

In a second aspect of the present invention, there is provided an image pickup apparatus, comprising a display unit configured to display a page of an electronic album on a display section, a detection unit configured to detect that a position on the page has been designated, a generation unit configured to generate an image file by executing image pickup processing when detection by the detection unit has occurred, a calculation unit configured to calculate an area on the page based on the designated position, and a storage unit configured to store the generated image file in association with the calculated area.

In a third aspect of the present invention, there is provided a method of controlling an image pickup apparatus, comprising displaying a through-the lens-image obtained by shooting an object, on a display section, by inserting the through-the lens-image in a plurality of frames in a template, detecting that one of the plurality of frames in which the through-the lens-image is displayed is designated, generating an image file by executing image pickup processing when the detecting has occurred, and storing the generated image file in association with the designated frame of the plurality of frames in the template.

In a fourth aspect of the present invention, there is provided a method of controlling an image pickup apparatus, comprising displaying a page of an electronic album on a display section, detecting that a position on the page has been designated, generating an image file by executing image pickup processing when the detecting has occurred, calculating an area on the page based on the designated position, and storing the generated image file in association with the calculated area.

In a fifth aspect of the present invention, there is provided a non-transitory computer-readable storage medium storing a computer-executable program for causing a computer to execute a method of controlling an image pickup apparatus, wherein the method comprises displaying a through-the lens-image obtained by shooting an object, on a display section, by inserting the through-the lens-image in a plurality of frames in a template, detecting that one of the plurality of frames in which the through-the lens-image is displayed is designated, generating an image file by executing image pickup processing when the detecting has occurred, and storing the generated image file in association with the designated frame of the plurality of frames in the template.

In a sixth aspect of the present invention, there is provided a non-transitory computer-readable storage medium storing a computer-executable program for causing a computer to execute a method of controlling an image pickup apparatus, wherein the method comprises displaying a page of an electronic album on a display section, detecting that a position on the page has been designated, generating an image file by executing image pickup processing when the detecting has occurred, calculating an area on the page based on the designated position, and storing the generated image file in association with the calculated area.

According to the present invention, it is possible to generate an album by laying out desired images in desired positions by a simple operation, while confirming a result of the layout by a photographer when shooting images.

The features and advantages of the invention will become more apparent from the following detailed description taken in conjunction with the accompanying drawings.

BRIEF DESCRIPTION OF THE DRAWINGS

FIG. 2 is a flowchart of an album generation process executed by the digital camera shown in FIG. 1.

FIGS. 4A to 4C are views showing examples of album data used in the first embodiment.

FIGS. 6A to 6D are views showing examples of a screen for an album generation mode of the digital camera.

FIG. 7 is a flowchart of an album generation process executed by a digital camera as an image pickup apparatus according to a second embodiment.

FIGS. 9A to 9D are views showing examples of album data used in the second embodiment.

DETAILED DESCRIPTION OF THE EMBODIMENTS

The present invention will now be described in detail below with reference to the accompanying drawings showing embodiments thereof. In the embodiments, a description will be given of a so-called digital camera as an image pickup apparatus according to the present invention.

Figure 1:
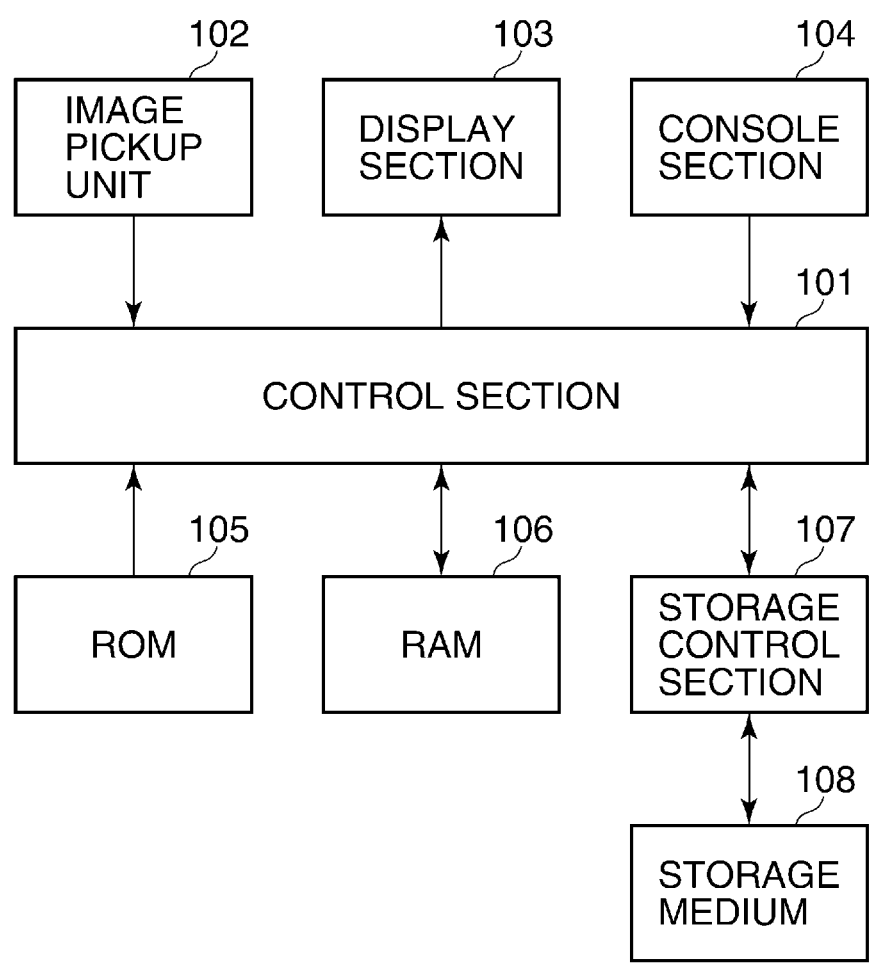
FIG. 1 is a schematic block diagram of a digital camera as an image pickup apparatus according to a first embodiment of the present invention.

FIG. 1 is a schematic block diagram of a digital camera as an image pickup apparatus according to a first embodiment of the present invention. Connected to a control section 101 are an image pickup unit 102, a display section 103, a console section 104, a ROM 105, a RAM 106, and a storage control section 107, and a storage medium 108 is connected to the storage control section 107.

The control section 101 includes a processor (CPU), a bus, an I/O interface, and so forth, and controls the overall operation of the digital camera by loading programs stored in the ROM 105 into a work area of the RAM 106, and executing the loaded programs. That is, the control section 101 controls not only operations of various mechanisms associated with the shooting and image processing, but also processing associated with album generation using images which have been shot (hereinafter referred to as the "shot images").

The image pickup unit 102 converts an analog signal acquired by shooting an object to digital data, and performs data compression processing by ADCT (adaptive discrete cosine transform) or the like. The image pickup unit 102 also performs lens control such as zooming, focusing, and diaphragm adjustment. The display section 103 is implemented e.g. by a liquid crystal panel or an organic EL panel, and an object image, a shot image, information input from the control section 101, an album data screen, a menu screen, and so on are displayed on the display section 103.

The console section 104 is a user interface for performing input operations on a touch panel, not shown, of the display section by a photographer. In the present embodiment, electrostatic sensors, not shown, are arranged all over the area of the touch panel of the display section 103, and the console section 104 is configured such that when a finger of the user touches any point of the touch panel of the display section 103, a signal indicative of coordinates of the touched point is delivered from an associated one of the electrostatic sensors. Upon reception of the signal indicative of the coordinates from the console section 104, the control section 101 detects which position on the screen displayed on the display section 103 the finger or the like of the photographer is brought into contact with. Note that hereinafter, an operation for bringing a finger or the like into contact with the panel of the console section 104 by the photographer is referred to as the "touch".

The ROM 105 is a nonvolatile memory, and stores program data to be executed by the control section 101, template data, and so forth. The RAM 106 is a main memory of the control section 101, and is used as a work area for execution of programs by the control section 101, a storage area for temporarily storing data, and a storage area for temporarily storing image data input from the image pickup unit 102, album data to be subjected to edit processing by the control section 101, and so forth.

The storage medium 108 is a medium for storing image data and album data (hereinafter mentioned as the "image data etc."), and is e.g. a memory card which can be mounted and removed to and from the digital camera, or a hard disk drive. The storage medium 108 may be a flash device or a hard disk incorporated in the digital camera or the like. The storage control section 107 performs processing for storing image data etc. in the storage medium 108 and inversely reading out stored image data from the storage medium 108.

FIG. 2 is a flowchart of an album generation process executed by the digital camera as an image pickup apparatus according to the first embodiment, and the steps of the album generation process are executed by the control section 101. The album generation can be started e.g. by the photographer selecting an album generation mode from a menu screen (not shown) displayed on the display section 103 via the console section 104.

In the album generation mode, the control section 101 reads out templates for album data from the ROM 105 into the RAM 106, and displays a template selection screen on the display section 103, for prompting the photographer to select one of the templates for album data (step S201). FIGS. 3A to 3D are views schematically showing examples of templates for selection on the template selection screen displayed in the step S201. Here, it is assumed that four kinds of templates illustrated in FIGS. 3A to 3D are provided in advance, and rectangle frames containing numbers illustrated in FIGS. 3A to 3D, respectively, represent image frames.

The album data contains layout information on an album, and the layout information includes information on positions where the image frames are disposed, the sizes of the image frames, and so forth. The album data is described using the XML (eXtensible Markup Language) standard, and the control section 101 translates the album data described in the XML standard, thereby causing the album data to be displayed on the display section 103.

FIGS. 4A to 4C are views showing examples of album data. FIG. 4A illustrates an example of album data described in the XML standard for the FIG. 3A template. Note that FIGS. 4B and 4C will be appropriately described, hereinafter. In the album data in FIG. 4A, the coordinates and the horizontal and vertical sizes of respective image frames are set as attributes of an <image> element 401, an <image> element 402, an <image> element 403, and an <image> element 404. Further, in each of the <image> elements 401 to 404, a source of an image data file inserted in each image frame is described in a "xlink:href" attribute. However, as an initial value, no image file is associated with each <image> element, and hence "camera" indicative of a video image (through-the-lens-image) sequentially input from the image pickup unit 102 is written.

In the present embodiment, basically, the control section 101 performs display on the display section 103 by associating an image file in the storage medium 108 with album data, based on a file path described in the "xlink:href" attribute. However, when a character string of "camera" is described, the control section 101 associates image data input from the image pickup unit 102 with album data, by way of exception, and displays the album data together with the image data on the display section 103.

Note that a description (<svg> element) enclosed by <svg> tags in FIG. 4A is layout information corresponding to one page of the album. By describing the <svg> elements corresponding in number to the number of pages in parallel, it is possible to cause the album data to contain layout information on a plurality of pages, whereby it is possible to form album data corresponding to one album. Further, it is also to form album data corresponding to one album by a plurality of album data items.

Referring again to FIG. 2, when a template for album data is selected by the photographer's operation (step S202), the control section 101 generates initial album data by copying the selected template, and stores the initial album data in the storage medium 108 (step S203). In the first embodiment, the following procedure will be described assuming that the template shown in FIG. 3A is selected.

Figure 5:
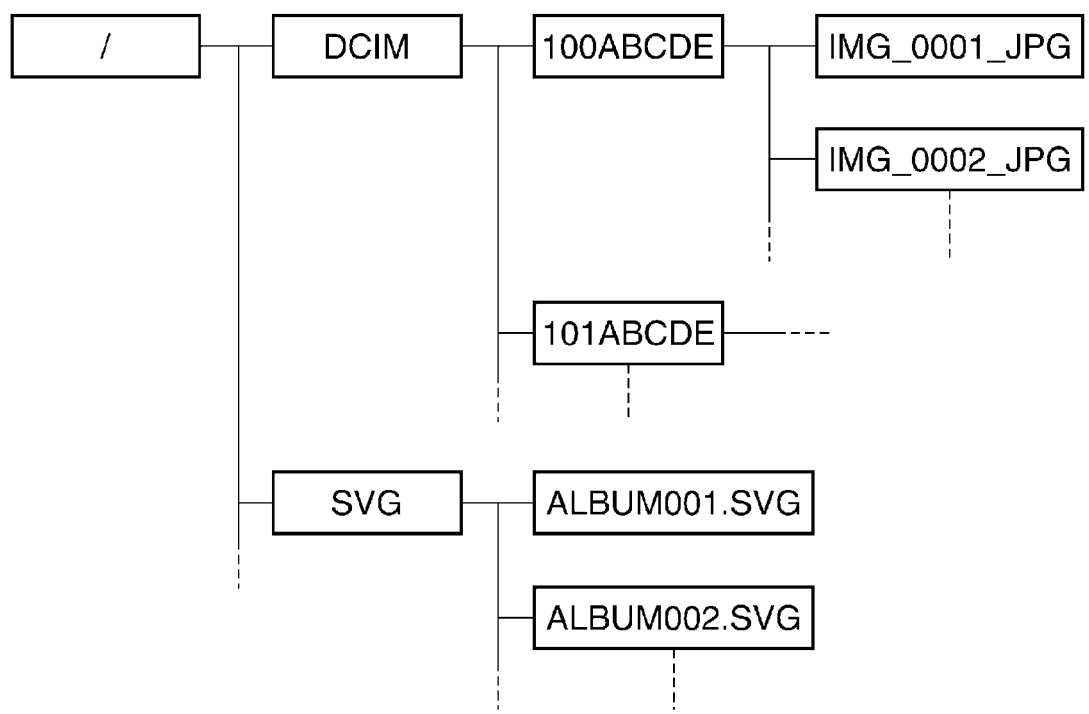
FIG. 5 is a diagram showing a directory structure of a storage medium included in the digital camera shown in FIG. 1.

FIG. 5 is a diagram showing a directory structure of the storage medium 108, and the album data generated in the step S203 is stored in a SVG directory under a root directory of the storage medium 108.

Figure 3A:
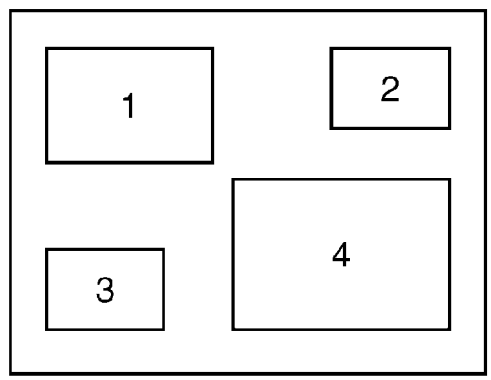
FIGS. 3A to 3D are views schematically showing examples of a template selection screen displayed in a step in the album generation process in FIG. 2.
Figure 3B:
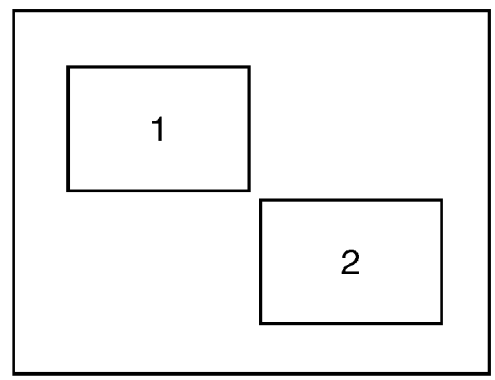
Figure 3C:
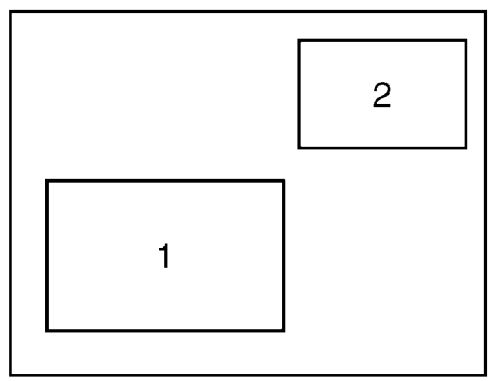
Figure 3D:
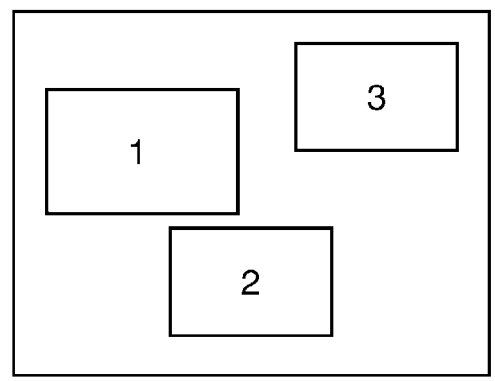

When the photographer selects the template shown in FIG. 3A, the control section 101 causes the display section 103 to display a screen in the album generation mode. FIGS. 6A to 6D are views showing examples of the screen in the album generation mode. In FIG. 6A, reference numeral 601 denotes an area for arranging images. Rectangles denoted by reference numerals 602, 603, 604, and 605, which are arranged within the area 601, denote image frames corresponding to the <image> elements 401 to 404 appearing in FIG. 4A, respectively. In the step S203, none of the image frames 602 to 605 have an image inserted therein yet, and hence the same through-the lens-image is displayed in all of the image frames as image data input from the image pickup unit 102. Note that FIGS. 6B and 6C will be described hereinafter, on an as-needed basis.

The control section 101 displays the through-the lens-image in the image frames as shown in FIG. 6A, and determines whether or not a shooting instruction is given by the photographer, i.e. whether or not the photographer has touched any of the image frames 602 to 605 (step S204). Until the console section 104 detects that any of the image frames 602 to 605 is touched (NO to the step S204), the control section 101 is in a state of being waiting for a shooting instruction. When the console section 104 detects a touch of the photographer on the coordinates of any of the image frames 602 to 605 (YES to the step S204), the control section 101 executes a still image-shooting operation by the image pickup unit 102, and generates a still image (step S215). Further, the control section 101 stores the generated still image as a still image file under a folder named DCIM folder, which is provided in the storage medium 108 according to the directory structure shown in FIG. 5 (step S205). Hereafter, it is assumed that in the step S215, the photographer has touched the image frame 602 shown in FIG. 6A, whereby a still image file named as "IMG_0001.JPG" has been generated.

Subsequently, the control section 101 stores the still image file generated in the step S215 in association with the image frame of the album data, and updates the album data (step S206). More specifically, the control section 101 changes the description of the value of the "xlink:href" attribute of the <image> element 401 shown in FIG. 4A from "camera" indicative of the through-the lens-image to "/DCIM/100CANON/IMG_0001.JPG" indicative of the generated still image file.

FIG. 4B shows the album data updated in the step S206, and FIG. 6B shows an example of the screen displayed on the display section 103 after updating the album data. In FIG. 4B, in an <image> element 405 corresponding to the touched image frame 602, the value of the "xlink:href" attribute has been updated. Further, the still image generated in the step S215 is inserted in an image frame 607 shown in FIG. 6B corresponding to the image frame 602 shown in FIG. 6A, and the through-the lens-image is displayed in other image frames 608, 609, and 610. That is, the through-the lens-image is displayed in the image frames with which no image file has been associated, and in the image frame with which an image file has been associated, image data corresponding to the associated image file is inserted and displayed in a predetermined size. It is understood that according to the above-described processing, the still image generated by shooting is inserted in the image frame 602 on which the photographer's touch is detected in the step S204, and is displayed on the screen.

Next, the control section 101 determines whether or not image files are associated with all of the remaining image frames (step S207). If image files are not associated with all of the remaining image frames (NO to the step S207), the present process returns to the step S204. That is, the steps S204 to S207 are repeated until still images are inserted in all of the image frames.

FIG. 4C shows an example of the album data when still images are inserted in all of the image frames, and FIG. 6C shows an example of the screen displayed on the display section 103 at the time. In FIG. 4C, the values of the "xlink:href" attribute of <image> elements 406, 407, and 408 are rewritten into paths for the respective still image files, and are updated. In accordance with this, in FIG. 6C, the still images have been inserted not only to an image frame 611 corresponding to the image frame 607 shown in FIG. 6B, but also to image frames 612, 613, and 614 corresponding to the image frames 608, 609, and 610, shown in FIG. 6B, respectively.

When all of the image frames have been filled (YES to the step S207), the control section 101 displays a screen on the display section 103 for inquiring of the photographer as to whether or not to generate next album data, and determines a photographer's instruction (step 208). FIG. 6D shows an example of an inquiry screen displayed on the display section 103 in the step S208. If the photographer touches "YES" on the inquiry screen shown in FIG. 6D, it is determined that next album data is to be generated (YES to the step S208), so that the present process returns to the step S201. On the other hand, if the photographer touches "NO" on the inquiry screen shown in FIG. 6D, it is determined that next album data is not to be generated (NO to the step S208), so that the album generation process is terminated.

According to the above-described process, only by performing the operation for touching an image frame displayed on the display screen of the digital camera as the image pickup apparatus, the photographer can not only shoot an image, but also generate an album by inserting the shot image in the desired image frame designated by the photographer (i.e. touched image frame).

Note that in the present embodiment, in the step S204, a still image-shooting operation is executed when a touch to an image frame by the photographer is detected. However, this is not limitative, but to improve image quality of a shot image, the shooting operation may be executed after performing the autofocus processing or the automatic exposure processing, or when a shooting button, not shown, is depressed, as in a usual way, based on the coordinates touched before the shooting operation.

Further, although in the present embodiment, all of the image frames displayed in the album data are indicated by the same aspect ratio (see FIGS. 3A to 3D), this is not limitative. For example, in the XML description of the album data shown in FIGS. 4A to 4C, by changing the values of the "width" attribute and the "height" attribute of a predetermined <image> element, it is possible to adapt the image frame to a change in the aspect ratio. Here, it is understood that when the aspect ratio of an image acquired by the image pickup unit 102 is different from the aspect ratio of an image frame, it is also possible to perform trimming processing with respect to a still image to be inserted in the image frame so as not to generate a blank area in the image frame, and then display the processed still image. At this time, editing of the image, such as trimming processing, is executed by the control section 101.

In the present embodiment, in the step S204, a shooting operation is executed when a touch to an image frame by the photographer is detected. This is not limitative, but for example, a digital camera equipped with the image pickup unit 102 adapted to the multi-aspect ratio may be configured such that the aspect ratio of an image to be acquired by the image pickup unit 102 is set according to the aspect ratio of a touched image frame, and then the shooting operation is executed. That is, the digital camera may be configured such that the control section 101 controls the shooting by setting the aspect ratio of an image to be acquired by the image pickup unit 102 to a value closest to the aspect ratio of the image frame.

Hereafter, a description will be given of error handling performed when a plurality of image frames are touched by the photographer in a very short time during execution of the album generation process described with reference to FIGS. 2 to 6D.

In the step S204, the console section 104 detects that the photographer has touched (hereinafter referred to as the "current touch") any of the image frames 602 to 605 (see FIG. 6A). Then, the control section 101 determines whether or not processing for generating a still image file associated with a touch (hereinafter referred to as the "preceding touch") detected immediately before the detection of the current touch (step S205) and associating the still image file with the album data (step S206) has been completed.

If the processing has been completed, the process proceeds to the step S205, wherein the shooting operation is executed, and then a new still image file associated with the current touch is generated. On the other hand, if the processing has not been completed, the still image file associated with the current touch is not generated, but the still image file associated with the preceding touch is generated. Then, a still image file identical to the generated still image file is associated with the album data as the still image file associated with the current touch, and is displayed on the display section 103.

The above-described determination to be determined in the latter part of the step S204 can be realized e.g. by using a flag indicative of a status. That is, this determination can be realized by executing the following processing: an initial value of the flag is set to 0, the flag is incremented when a touch by the photographer is detected in the step S204, and is decremented when the step S204 is completed. If the flag is equal to 0, the process proceeds to the step S205, whereas if not, the process skips over the step S205 to the step S206.

By executing the above-described error handling, when the photographer touches a plurality of image frames within a very short time period (i.e. when the photographer touches the image frames in succession), the shooting and still image file generation in the step S205 is omitted. This makes it possible to prevent processing for generating a plurality of similar still images from being executed.

In the above error handling, to determine whether or not to execute the step S205, it is determined whether or not the processing for generating the still image file associated with the preceding touch and associating the still image file with the album data has been completed. However, this is not limitative, but for example, by using a timer, a length of a time period after the preceding touch has been detected until a next touch is detected may be used for determining whether or not to execute the step S205.

Note that the error handling can be configured such that when the console section 104 detects that the photographer has simultaneously touched a plurality of image frames, warning is performed e.g. by displaying an error message on the display section 103, and then the process returns to the step S204. Even when the photographer has touched a plurality of image frames within a very short time, similarly, warning may be performed.

Next, a description will be given of a second embodiment of the present invention. The hardware configuration of the present embodiment is the same as that of the first embodiment, and hence component elements corresponding to those of the first embodiment are denoted by the same reference numerals, while omitting the description thereof. FIG. 7 is a flowchart of an album generation process executed by a digital camera as an image pickup apparatus according to the second embodiment, and the steps of the album generation process are executed by the control section 101. The album generation can be started e.g. by selecting the album generation mode by the photographer from a menu screen (not shown) displayed on the display section 103 via the console section 104.

Figure 8A:
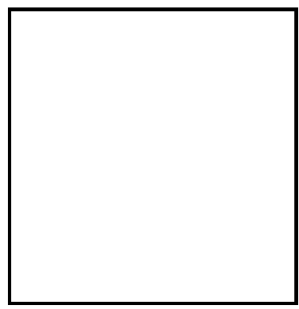
FIGS. 8A to 8C are schematic views of a template selection screen displayed in a step in the album generation process in FIG. 7.
Figure 8B:
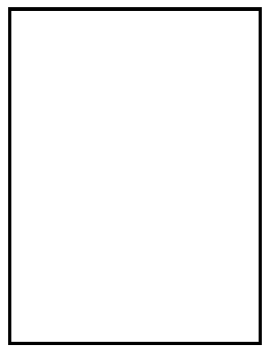
Figure 8C:
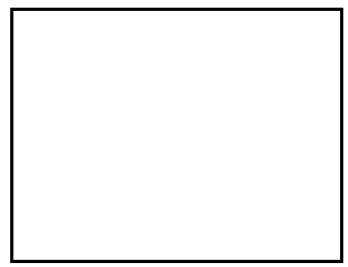

In the album generation mode, the control section 101 reads out templates for album data from the ROM 105 into the RAM 106, and displays a template selection screen on the display section 103, for prompting the photographer to select one of the templates for album data (step S701). FIGS. 8A to 8C are schematic views showing examples of the template selection screen displayed in the step S701. In the illustrated example, three kinds of templates which are different in shape are provided in advance for the album generation, and the photographer can select one of these templates. At this time, the album selection mode may be configured such that the photographer can select not only the shape of the template, but also the color of the template.

FIGS. 9A to 9D are views showing examples of album data, and FIG. 9A is a view showing an example of album data described in the XML standard for the FIG. 8A template. A description (<svg> element) enclosed by <svg> tags in FIG. 9A is layout information corresponding to one page of the album. By describing <svg> elements corresponding in number to the number of pages in parallel, it is possible to cause the album data to contain layout information on a plurality of pages, whereby it is possible to form album data corresponding to one album. Further, it is also possible to form album data corresponding to one album by a plurality of album data items.

The shape and size of an album are set based on a "width" attribute and a "height" attribute of a <svg> element, and they are each set to a value of 600 in FIG. 9A. Therefore, the shape of the template described in FIG. 9A is a square as shown in FIG. 8A.

A page number of the album is described in a <title> element. In FIG. 9A, "Page_1" indicative of a first page is described. Although an image to be inserted in the album is described using an <image> element, no image has been shot yet in the step S701, and hence there is no description of an <image> element in FIG. 9A. The <image> element will be explained in an explanation of a subsequent part of the process again.

Referring again to FIG. 7, when a template for the album data is selected by the photographer's operation (step S702), the control section 101 generates initial album data by copying the selected template, and stores the generated data in the storage medium 108 (step S703). The album data is stored in the storage medium 108, similarly to the first embodiment, according to the directory structure shown in FIG. 5. As shown in FIG. 5, the generated album data is stored in the SVG directory under the root directory of the storage medium 108.

In the second embodiment, a description will be given of the following procedure, assuming that a square template shown in FIG. 8A has been selected in the step S702. When the template shown in FIG. 8A is selected by the photographer, the control section 101 causes the display section 103 to display a screen for the album generation mode (step S703). FIGS. 10A to 10E are views showing examples of the screen for the album generation mode according to the second embodiment.

Figure 10A:
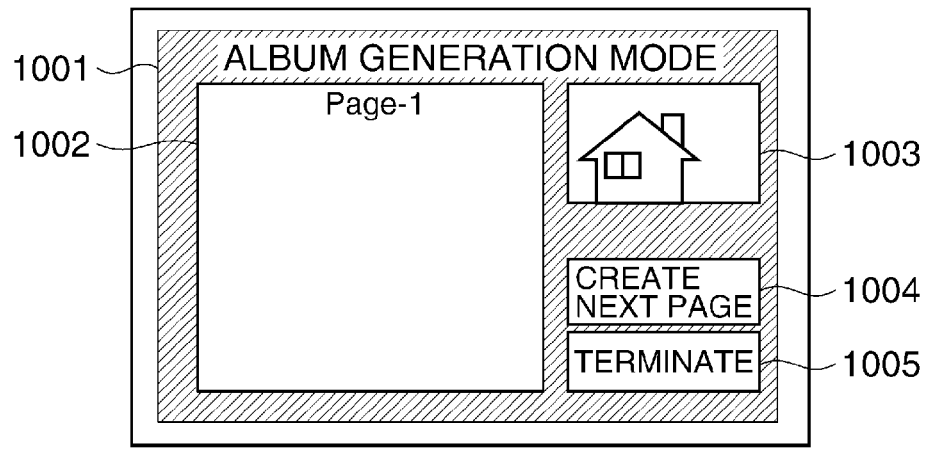
FIGS. 10A to 10E are views showing examples of a screen for an album generation mode of the digital camera as the image pickup apparatus according to the second embodiment.

The screen shown in FIG. 10A corresponds to the album data shown in FIG. 9A, and in the step S703, the screen shown in FIG. 10A is displayed on the display section 103. In FIG. 10A, reference numeral 1001 denotes a display screen of the display section 103 of the digital camera. Reference numeral 1002 denotes an album page area as an area for arranging images, and in FIG. 10A, the album page area 1002 having a shape shown in FIG. 8A selected on the template selection screen.

Reference numeral 1003 denotes a through-the lens-image area for displaying a through-the lens-image input from the image pickup unit 102, and the photographer can perform shooting while watching the through-the lens-image area 1003. Reference numeral 1004 denotes a button for creating a next page of the album. Reference numeral 1005 denotes a button for terminating the album generation mode. When the button 1005 is depressed, the control section 101 terminates the album generation mode, and returns the display screen to the menu screen (not shown).

After execution of the step S703, the control section 101 determines whether or not the console section 104 has detected that a shooting instruction is given by the photographer, i.e. that the photographer has touched anywhere within the album page area 1002 (step S704). Until the console section 104 detects a shooting instruction (NO to the step S704), the control section 101 is in a state of waiting for a shooting instruction.

If a shooting instruction is detected (YES to the step S704), the control section 101 calculates coordinate information on the album page area 1002 based on the coordinate information on the display screen 1001 given from the console section 104, which is indicative of a position where the photographer has touched (step S715), and executes the shooting operation by the image pickup unit 102 to generate a still image (step S725). Further, the control section 101 stores the generated still image under the DCIM folder provided in the storage medium 108 as a still image file according to the directory structure shown in FIG. 5 (step S705). It is assumed that the generated still image file is named as "IMG_0001.JPG" similarly to the file name in the first embodiment.

Figure 10B:
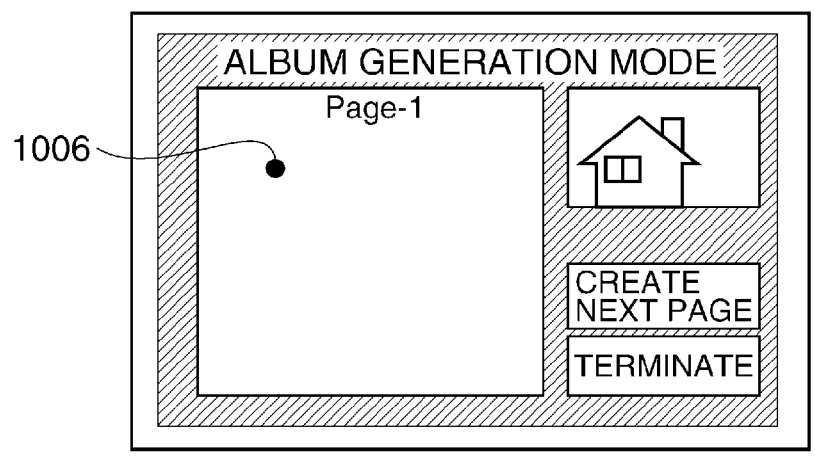

In the following description, it is assumed that the console section 104 has detected that the photographer has touched a point 1006 within the album page area 1002 on the screen shown in FIG. 10B in the step S704. Therefore, the coordinate information on the album page area 1002, calculated in the step S715, represents coordinates corresponding to the point 1006 on the album page area 1002.

In the present embodiment, the coordinates of the album page area 1002 are set such that an upper left corner is the origin (0, 0), a largest value of the x-coordinate is a value of a "width" attribute of a <svg> element of album data, and a largest value of the y-coordinate is a value of a "height" attribute of the <svg> element of the album data. Therefore, for example, the album page area 1002 shown in FIG. 10A is a coordinate space defined by an upper left point (0, 0), an upper right point (600, 0), a lower left point (0, 600), and a lower right point (600, 600). In the illustrated example, coordinates (150, 150) are calculated which indicate the point 1006 in the album page area 1002 in the step S715.

After the storing processing in the step S705, the control section 101 further associates the still image file generated in the step S725 with the area for the album data, and updates the album data storing the association (step S706). More specifically, the control section 101 performs processing for describing the still image file in the album data such that the still image data corresponding to the still image file is output in a state inserted in a designated location in the album data area. To be more specific, according to the description in the album data, the still image of a fixed size is inserted and displayed in the album page area such that the point 1006 is positioned in the center of the still image.

Thus updated album data description is shown in FIG. 9B. In FIG. 9B, the description of the <image> element corresponds to the inserted still image. An "id" attribute is an ID number of the still image, and the still image is a first still image inserted in an identical page, so that the value of the "id" attribute is 1.

The "x" attribute and the "y" attribute represent a position in which the still image is inserted, respectively, and are the coordinates of the upper left corner of the still image. The "width" attribute and the "height" attribute represent the size of the still image. In the illustrated example, it is assumed that the size of the still image to be inserted in the album data is fixed to a lateral size of 200 and a vertical size of 150. The respective values of the "x" attribute and the "y" attribute are determined from the size and central coordinates of the still image. The value of the "x" attribute is described as "50" obtained by subtracting a half (=100) of the lateral size of the still image from the x coordinates (=150) of the point 1006, and the value of the "y" attribute is described as "75" obtained by subtracting a half (=75) of the vertical size of the still image from the y coordinates (=150) of the point 1006.

The "xlink:href" attribute represents a file path to where the still image is stored. In the present embodiment, as shown in FIG. 5 similarly to the first embodiment, the file path is described as "DCIM/100CANON/IMG_0001.JPG".

Figure 10C:
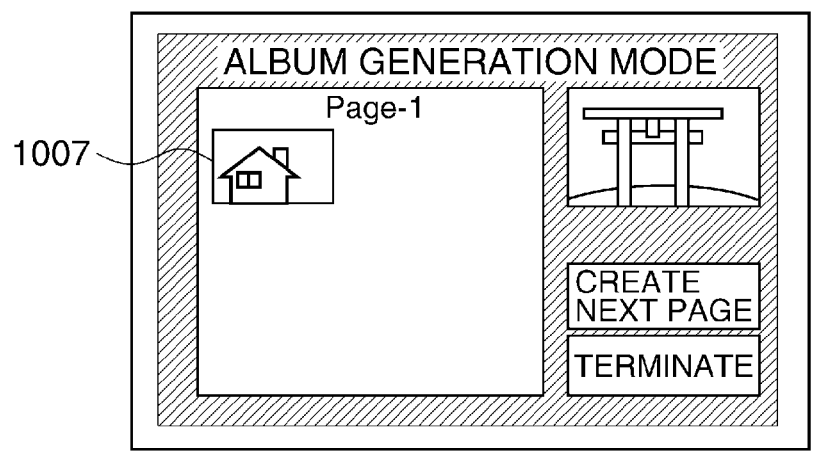

FIG. 10C shows an example of a screen for the album generation mode displayed on the display section 103 based on the album data shown in FIG. 9B. In the screen in FIG. 10C, reference numeral 1007 denotes the inserted still image, which is inserted such that the upper left corner of the still image is positioned at the coordinates (50, 75), i.e. the center of the still image is at the coordinates (150, 150) of the point 1006.

Figure 10D:
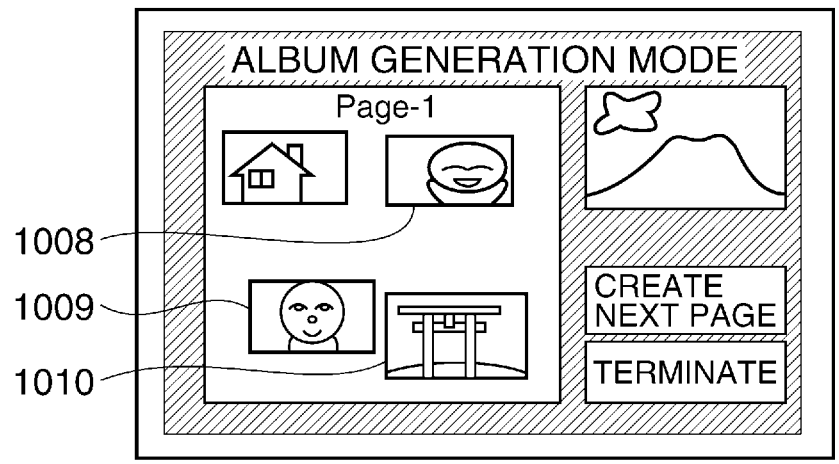

Although not shown in the FIG. 7 flowchart, by repeatedly executing the steps S704 to S706, still images are sequentially inserted in the album page area 1002. FIG. 9C shows an example of the album data after three more still images have been inserted, and FIG. 10D shows an example of a screen for the album generation mode displayed on the display section 103 based on the album data shown in FIG. 9C. As shown in FIG. 9C, there are added three <image> elements the "id" attributes of which are "2", "3", and "4", which correspond to the added three still images, and the added three still images 1008, 1009, and 1010 are displayed as shown in the screen in FIG. 10D.

In the course of generation of the album performed as described above, the control section 101 determines whether or not the console section 104 detects that the button 1004 for creating a next page has been depressed by the photographer (step S707). If the button 1004 has been depressed (YES to the step S707), the control section 101 inserts a new page by adding a new <svg> element for the next page into the album data (step S708), and the process returns to the step S704.

Figure 10E:
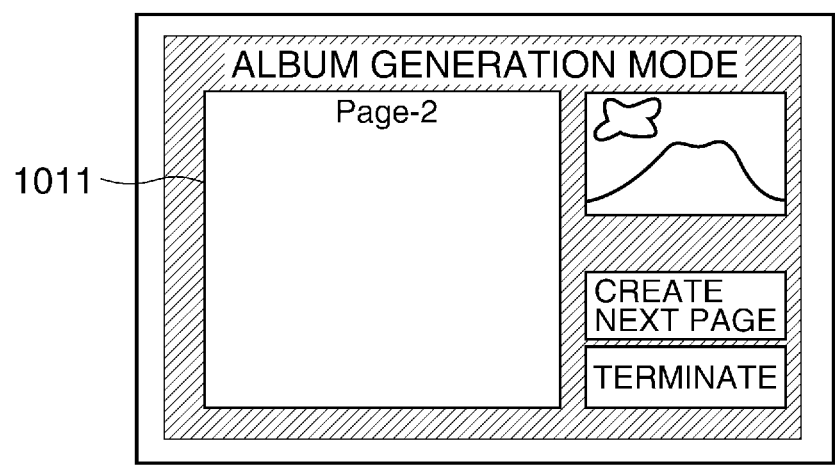

FIG. 9D shows the updated album data when the button 1004 for creating a new page is depressed on the screen shown in FIG. 10D. As shown in FIG. 9D, a new <svg> element is added, and "Page_2" indicative of a second page is described in a <title> element in the new <svg> element. FIG. 10E shows an example of a screen for the album generation mode displayed on the display section 103 based on the album data shown in FIG. 9D. As shown in FIG. 10E, "Page_2" indicative of the second page is described in an album page area 1011 of the second page.

On the other hand, in the course of generation of the album, if the button 1005 is depressed (YES to the step S709) instead of the button 1004 (NO to the step S707), the control section 101 terminates the album generation mode. If neither the button 1004 (NO to the step S707) nor the button 1005 (NO to the step S709) is depressed, the process returns to the step S704.

According to the above-described process, only by touching desired positions within the album page area 1002 displayed on the display section 103, the photographer can generate an album in which shot images are inserted in respective touched positions.

Note that although in the present embodiment, the size of the still image inserted in the album data is fixed to the lateral size of 200 and the vertical size of 150 in the step S706, this is not limitative. For example, a screen (not shown) for setting various parameters in the album generation mode may be displayed to the photographer so as to enable the photographer to change and set a desired image size on the screen.

Further, the image size may be automatically set such that a still image is enlarged, using a point where the photographer has touched as a center, to such an extent that a still image to be inserted does not overlap a still image which has been inserted, or to such an extent that the still image does not extend off the album page area 1002. Further, the size of a still image to be inserted may be determined according to how the photographer touches the album page area 1002 (a contact area where a finger is brought into contact, a contact time period during which the finger is in contact, etc.). This can be realized by adding a function of calculating the contact area and/or the contact time period to the console section 104. In this case, for example, the image size can be set such that as the contact area is larger, and the contact time period is longer, the size of the still image is larger.

As a variation of the present embodiment, a still image to be inserted in the album data may overlap a still image which has been inserted, and in this case, the still image which has been inserted may be displayed on a rear side, and the newly inserted one may be displayed on a front side, or the photographer may be warned on the overlapping of images. Further, in a case where a still image to be inserted in the album data extends off the album page area 1002, the photographer may be warned on the inconvenience.

Although in the present embodiment, in the step S707, when the photographer depresses the button 1004 for creating a new page, a new page is inserted and the page is switched to the new page, this is not limitative, but switching to the new page may be realized in a different manner. For example, a comparison may be performed between a total area of the album page area 1002 and a total of areas occupied by the inserted still images, and if a ratio of the total of the areas occupied by the inserted still image to the total area of the album page area 1002 becomes larger than a predetermined value set in advance, the page may be automatically switched. Further, if the number of still images inserted in the album page area 1002 of one page becomes larger than a predetermined number set in advance, the page may be automatically switched.

Note that in the second embodiment, the error handling executed when the photographer touches a plurality of points within the album page area 1002 simultaneously or within a very short time is executed almost in the same manner as executed in the first embodiment. That is, the same error handling is executed except that "touching a plurality of image frames by the photographer" in the first embodiment is changed to "touching a plurality of points within the album page area 1002 by the photographer" in the second embodiment.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-153814, filed Jul. 6, 2010, which is hereby incorporated by reference herein in its entirety.

What is claimed is:

1. An image pickup apparatus comprising:
    a display control unit configured to cause a display unit to display a plurality of frames and control the display unit to display a still image or a live view image obtained by an image pickup unit;
    a selection unit configured to select any one frame in response to a touch operation to an inside of any one of the plurality of displayed frames;
    a still image shooting unit configured to generate the still image by performing a predetermined image pickup process in response to a touch operation that selects the frame by the selection unit while the live view image is being displayed in the selected frame,
    wherein said display control unit switches content of the inside of the selected frame from the live view image to the still image generated by said still image shooting unit in response to the touch operation that selects the frame by the selection unit while the live view image is being displayed in the selected frame, and
    wherein said selection unit is configured to further designate a next frame in response to a touch operation to an inside of any other one of the displayed frames after said still image is generated by the still image shooting unit.

2. The image pickup apparatus according to claim 1, wherein said display control unit switches content of the inside of the next frame from a live view image to a new still image in response to the touch operation to the inside of the next frame while the live view image is being displayed in the next frame after said display control unit switches the content of the inside of the frame that was previously selected by said selection unit to the still image.

3. The image pickup apparatus according to claim 1, further comprising an inquiry unit configured to display a predetermined inquiry screen in a case where the still images have been displayed in the insides of all the plurality of frames.

4. The image pickup apparatus according to claim 1, further comprising a storage unit configured to store the still image as an image file.

5. The image pickup apparatus according to claim 1, further comprising an album generating unit configured to generate album data in which each of the still images is inserted to each of the plurality of frames.

6. The image pickup apparatus according to claim 1, further comprising:
a template storage unit configured to store a plurality of templates, each of which includes the plurality of frames; and
a template selection unit configured to select one of the plurality of templates,
wherein said display control unit causes the display unit to display the plurality of frames so as to be arranged according to the template selected by said template selection unit.

7. The image pickup apparatus according to claim 1, wherein the live view image is a movie video image sequentially obtained by said image pickup unit.

8. The apparatus according to claim 1, wherein said display control unit controls to display unit to display the live view image in another one of the plurality of frames.

9. The image pickup apparatus according to claim 1, wherein the predetermined image pickup process includes at least one of a focusing adjustment processing or an exposure adjustment processing for the still image.

10. The image pickup apparatus according to claim 1, further comprising:
a storage unit configured to store the still images of the plurality of frames as a file.

11. A method of controlling an image pickup apparatus, the method comprising the steps of:
causing a display unit to display a plurality of frames and controlling the display unit to display a still image or a live view image obtained by an image pickup unit;
selecting any one frame in response to a touch operation to an inside of any one of the plurality of displayed frames;
generating the still image by performing a predetermined image pickup process in response to a touch operation that selects the frame in the selecting step while the live view image is being displayed in the selected frame; and
switching content of the inside of the selected frame from the live view image to the still image generated in the generating step in response to the touch operation that selects the frame in the selecting step while the live view image is being displayed in the selected frame,
wherein the selecting step also designates a next frame in response to a touch operation to an inside of any other one of the displayed frames after the still image is generated in the generating step.

12. A non-transitory computer-readable storage medium storing a computer executable program executable by a computer to execute of a method of controlling an image pickup apparatus, the method comprising the steps of:
causing a display unit to display a plurality of frames and controlling the display unit to display a still image or a live view image obtained by an image pickup unit;
selecting any one frame in response to a touch operation to an inside of any one of the plurality of displayed frames;
generating the still image by performing a predetermined image pickup process in response to a touch operation that selects the frame in the selecting step while the live view image is being displayed in the selected frame; and
switching content of the inside of the selected frame from the live view image to the still image generated in the generating step in response to the touch operation that selects the frame in the selecting step while the live view image is being displayed in the selected frame,
wherein the selecting step also designates a next frame in response to a touch operation to an inside of any other one of the displayed frames after the still image is generated in the generating step.

13. The storage medium according to claim 12, further comprising the step of:
switching content of the inside of the next frame from a live view image to a new still image in response to the touch operation to the inside of the next frame while the live view image is being displayed in the next frame after switching the content of the inside of the frame that was previously selected in the selecting step to the still image.

14. The storage medium according to claim 12, further comprising the step of:
displaying a predetermined inquiry screen in a case where the still images have been displayed in the insides of all the plurality of frames.

15. The storage medium according to claim 12, further comprising the step of:
storing the still image as an image file.

16. The storage medium according to claim 12, further comprising the step of:
generating album data in which each of the still images is inserted to each of the plurality of frames.

17. The storage medium according to claim 12, further comprising the steps of:
storing a plurality of templates, each of which includes the plurality of frames; and
selecting one of the plurality of templates,
wherein the plurality of frames are displayed so as to be arranged according to the selected template.

18. The storage medium according to claim 12, wherein the live view image is a movie video image sequentially obtained by the image pickup unit.

19. The storage medium according to claim 12, further comprising the step of:
controlling the display unit to display the live view image in another one of the plurality of frames.

20. The storage medium according to claim 12, wherein the predetermined image pickup processing includes at least one of a focusing adjustment processing or an exposure adjustment processing for the still image.

21. The storage medium according to claim 12, wherein the method further comprises the step of:
   storing the still images of the plurality of frames as a file.

\* \* \* \* \*